(12) United States Patent
Zhu

(10) Patent No.: US 11,002,183 B1
(45) Date of Patent: May 11, 2021

(54) PORTABLE GENERATOR SET

(71) Applicant: SUZHOU YUANNENG DONGLI TECHNOLOGY CO., LTD., Jiangsu (CN)

(72) Inventor: Zhenghua Zhu, Jiangsu (CN)

(73) Assignee: SUZHOU YUANNENG DONGLI TECHNOLOGY CO., LTD., Suzhou (CN)

( * ) Notice: Subject to any disclaimer, the term of this patent is extended or adjusted under 35 U.S.C. 154(b) by 506 days.

(21) Appl. No.: 16/081,416

(22) PCT Filed: Mar. 1, 2017

(86) PCT No.: PCT/CN2017/000204
§ 371 (c)(1),
(2) Date: Aug. 30, 2018

(87) PCT Pub. No.: WO2017/148217
PCT Pub. Date: Sep. 8, 2017

(30) Foreign Application Priority Data

Mar. 2, 2016 (CN) .......................... 201610115999.3

(51) Int. Cl.
F02B 63/04 (2006.01)
H02K 7/18 (2006.01)
(52) U.S. Cl.
CPC ......... F02B 63/047 (2013.01); H02K 7/1815 (2013.01); F02B 2063/046 (2013.01)
(58) Field of Classification Search
USPC .......................... 290/1 A; 220/4.14, 560–569
See application file for complete search history.

(56) References Cited

U.S. PATENT DOCUMENTS

| 1,947,713 A | * | 2/1934 | Gumpper | ............... B62D 25/10 290/1 A |
| 4,526,286 A | * | 7/1985 | Jung | ................ B60K 15/03177 220/4.14 |
| 6,084,313 A | * | 7/2000 | Frank | ...................... F02B 63/04 123/2 |

(Continued)

FOREIGN PATENT DOCUMENTS

| CN | 1896473 A | 1/2007 |
| CN | 201047308 Y | 4/2008 |
| CN | 104564325 A | 4/2015 |

OTHER PUBLICATIONS

International Search Report of PCT Patent Application No. PCT/CN2017/000204 dated May 24, 2017.

Primary Examiner — Pedro J Cuevas

(57) ABSTRACT

A portable generator set (1) comprises an engine (6), a generator (7), a fuel tank (8), and a housing (5). The engine (6), the generator (7), and the fuel tank (8) are accommodated in the housing (5). The fuel tank (8) is constructed by a fuel tank housing (805), a fuel tank port (801), a fuel tank cap (802), and a fuel tank top surface (808). A protrusion structure protruding outward is provided on the fuel tank top surface (808). A hollow cavity (809) communicated with the inner cavity of the fuel tank (8) is formed on the inner side of the protrusion structure, such that fuel in the fuel tank (8) can enter the hollow cavity (809) when the generator set (1) is obliquely reclined. The generator set can be obliquely reclined, thereby improving security and facilitating transportation and storage of the generator set.

13 Claims, 17 Drawing Sheets

(56) References Cited

U.S. PATENT DOCUMENTS

| | | | | |
|---|---|---|---|---|
| 6,138,859 A * | 10/2000 | Aulph | B60K 15/03 | 220/563 |
| 6,176,260 B1 * | 1/2001 | Hahner | B60K 15/077 | 123/468 |
| 6,179,145 B1 * | 1/2001 | Roth | B60K 15/03 | 220/4.13 |
| 6,181,019 B1 * | 1/2001 | Frank | F02B 63/04 | 123/2 |
| 6,293,420 B1 * | 9/2001 | Richter | B60K 15/077 | 220/501 |
| 6,310,404 B1 * | 10/2001 | Frank | F02B 63/04 | 290/1 A |
| 6,313,543 B1 * | 11/2001 | Frank | F02B 63/04 | 123/2 |
| 6,338,420 B1 * | 1/2002 | Pachciarz | B60K 15/03177 | 220/4.13 |
| 7,455,190 B2 * | 11/2008 | Potter | B60K 15/03177 | 220/4.12 |
| 7,497,207 B2 * | 3/2009 | Lahn | F02D 41/3082 | 123/497 |
| 7,819,272 B2 * | 10/2010 | Sugiura | B60K 15/03177 | 220/563 |
| 8,590,565 B2 * | 11/2013 | Watanabe | B60K 15/077 | 137/582 |
| 8,608,012 B2 * | 12/2013 | Aoki | B60K 15/03177 | 220/563 |
| 9,162,564 B2 * | 10/2015 | Sakamoto | F02M 37/0076 | |
| 9,181,902 B2 * | 11/2015 | Kimoto | B60K 15/03 | |
| 9,186,984 B2 * | 11/2015 | Balzer | B60K 15/04 | |
| 9,221,332 B2 * | 12/2015 | Gebert | B60K 15/03177 | |
| 9,457,822 B2 * | 10/2016 | Rumao | F02B 63/044 | |
| 9,764,635 B2 * | 9/2017 | Kataoka | B60K 15/03177 | |
| 9,840,145 B2 * | 12/2017 | Kostrominov | B60K 15/063 | |
| 9,937,788 B1 * | 4/2018 | Tsukahara | B29C 51/105 | |
| 9,950,616 B2 * | 4/2018 | Yager | B60K 15/03177 | |
| 10,337,399 B2 * | 7/2019 | Rumao | B62B 1/22 | |
| 2001/0045433 A1 * | 11/2001 | Ellis | B32B 27/34 | 220/562 |
| 2002/0066737 A1 * | 6/2002 | Stack | B60K 15/077 | 220/564 |
| 2002/0113694 A1 * | 8/2002 | Muirhead | F02M 37/0011 | 340/450 |
| 2003/0015537 A1 * | 1/2003 | Konja | B60K 15/077 | 220/563 |
| 2010/0037837 A1 * | 2/2010 | Yamasaki | F02B 63/04 | 123/41.6 |
| 2012/0234616 A1 * | 9/2012 | Jaskowiak | B60K 15/077 | 180/69.4 |
| 2014/0217689 A1 * | 8/2014 | Rumao | H02K 7/1815 | 280/47.33 |
| 2016/0160753 A1 * | 6/2016 | Boutot | F02B 63/048 | 220/23.83 |
| 2017/0022894 A1 * | 1/2017 | Rumao | H02K 7/1815 | |

\* cited by examiner

PORTABLE GENERATOR SET

TECHNICAL FIELD

The present disclosure relates to generator set, particularly to a portable generator set.

BACKGROUND

A generator set mainly includes an engine, a generator and an electronic control system, and can convert chemical energy of fuel into electrical energy. Accordingly, the generator set is used in many applications, such as field work, emergency power supply, disaster rescue, outdoor life and travel, self-contained power supply for yachts and vehicles, mobile communication base station or other applications.

Compared with a traditional power frequency synchronous generator set, an inverter generator set equipped with a multi-pole permanent magnet generator has advantages of high efficiency, small size and light weight. The weight and size of such inverter generator set is about 50% of those of the traditional generator set. Therefore, it is a generator set by which a "portable" generator set can be really achieved.

However, an inverter generator set with a power of 2 kw generally has a weight of more than 20 kg, which still leads to inconvenience in transportation and carrying. As shown in FIG. 1a, according to an existing solution, a rotary pull rod 202 is arranged at the front side of a generator set 2, and wheels 201 are arranged at the bottom of the rear side of the generator set 2 in the transverse direction of the generator set. When the generator set 2 needs to be transported, the rotary pull rod 202 can be rotated upward to a highest position, and an operator can hold the handle to lift the front of the generator set to recline the generator set rearward and pull forward the generator set 2. However, many drawbacks exist in such design. When the operator lifts the front of the generator set 2 and pull forward it, since the generator set 2 is reclined rearward (opposite to advancing direction), the portion below the front of the generator set is very close to the feet and legs of the operator, and is easy to bump into, even hurt in severe case, the operator, which greatly hinders the operator to pull the generator set quickly. Furthermore, the opening and retracting of the rotary pull rod 202 is complex, which leads to inconvenience in operation and low efficiency. On the other hand, during pulling the generator set 2, the operator has to always apply an upward force to overcome the weight of the generator set in order to lift the front of the generator set. Since the length L of the generator 2 is larger (than the width W), the distance in the horizontal direction between the center of gravity of the generator set 2 and the center of the wheels 201 is large, therefore it is still very laborious for the operator to transport the generator set 2. In addition, the two wheels 201 of the existing generator set 2 share one axle. The axle passing through the entire generator set 2 occupies the space within the housing. Therefore, only wheels with small diameter can be used. However, the wheels with small diameter will lead to large resistance force between the wheels and the ground, and have poor adaptability for road conditions, thereby leading to poor passing ability of the generator set during the transportation.

In addition, since the existing generator set 2 has a height H larger than the width W, it has a high center of gravity. Therefore, it is easy to be fallen down toward left or right. When it is arranged in a moving transport, such as a car or a yacht, it is easy to be fallen down, which leads to fuel leak or other issues. Not only will the environment be polluted, but also safety hazards will be caused.

The portable generator set of the present disclosure intents to overcome the drawbacks of the existing generator set. A more suitable pull rod device and wheel devices, and a fuel tank which will not leak the fuel after falling down, are provided for the generator set. Accordingly, the efficiency and safety for transporting the generator set of the present disclosure are greatly increased, the labour for manually transporting the generator set is significantly reduced, and excellent portability can be obtained by the generator set. Furthermore, the generator set can be obliquely reclined toward a left side or right side, which greatly increases the safety and provides great convenience for the transportation and storage of the generator set.

SUMMARY

The object of the present disclosure is to overcome the drawbacks of the prior arts to provide a portable generator set.

In order to achieve the object above, and achieve the technical effects, the present disclosure may provide the following solutions:

A portable generator set including an engine, a generator, a fuel tank and a housing. The engine, the generator and the fuel tank may be housed in the housing. The fuel tank may be constructed by a fuel tank housing, a fuel tank port, a fuel tank cap and a fuel tank top surface. The fuel tank top surface may be provided with a protrusion structure protruding outward, and a hollow cavity communicated with an inner cavity of the fuel tank may be formed on an inner side of the protrusion structure such that the fuel in the fuel tank is able to enter into the hollow cavity when the generator set is reclined.

Further, the fuel tank port may further include a fuel tank port neck and a fuel tank port bottom surface. The fuel tank port neck may be a passage which is formed by extending upward from the fuel tank port bottom surface and by which the fuel may enter into or exit from the fuel tank. An external opening of the passage may be the fuel tank port.

Further, the generator set may be a cuboidal structure which has a length L, a width W and a height H and is constructed by the engine, the generator, the fuel tank and the housing. Shock absorption feet may be arranged on the bottom of the generator set. Foot pads may be arranged on a left side or a right side formed by the length L and the height H of the cuboidal structure of the generator set.

Further, a pull-type pull rod device may be arranged on the left side or the right side formed by the length L and the height H of the cuboidal structure of the generator set, and the pull rod device may be vertically arranged in a direction of the height H of the generator set.

Further, wheel devices may be arranged at a same side of the generator set at which the pull rod device is arranged, and the wheel devices may be arranged at bottom of the generator set and in a direction of the length L of the generator set.

Further, the fuel tank port, the fuel tank cap and a fuel switch may be arranged near the left side or the right side of the generator set. The fuel tank port and the corresponding fuel tank cap may be arranged at the top of the generator set. The fuel switch may be arranged on a side of the generator set below the fuel tank port and the fuel tank cap.

Further, the housing of the generator set may be provided with a maintenance cover, and an engine oil maintenance cover may be arranged on the maintenance cover.

Further, the generator set may be provided with a starting handle, and the starting handle may be arranged at the left side or the right side of the generator set.

Further, a damper handle may be arranged at the same side to the starting handle.

Further, a handle may be arranged at the top of the generator set, and the handle and the housing may be connected by a rotating connection or a fixed connection.

The advantages of the present disclosure are that:

the pull rod device, the wheel devices and the leak-proof fuel tank of the generator set of the present disclosure greatly increase the efficiency and safety for the transportation of the generator set, significantly reduce the burden for manually transporting the generator set, and enable the generator set to obtain excellent portability. Furthermore, it is allowed that the generator set is reclined toward the left side or the right side, which greatly increases the safety and greatly facilitate the transportation and storage of the generator set.

Figure 1A:
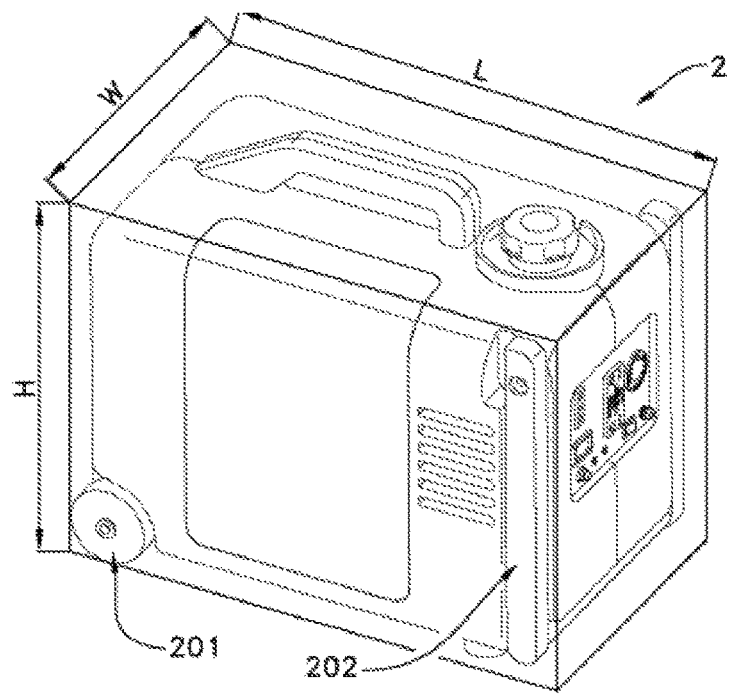
FIG. 1a is an outline view of the existing generator set with wheels and pull rod.
Figure 1B:
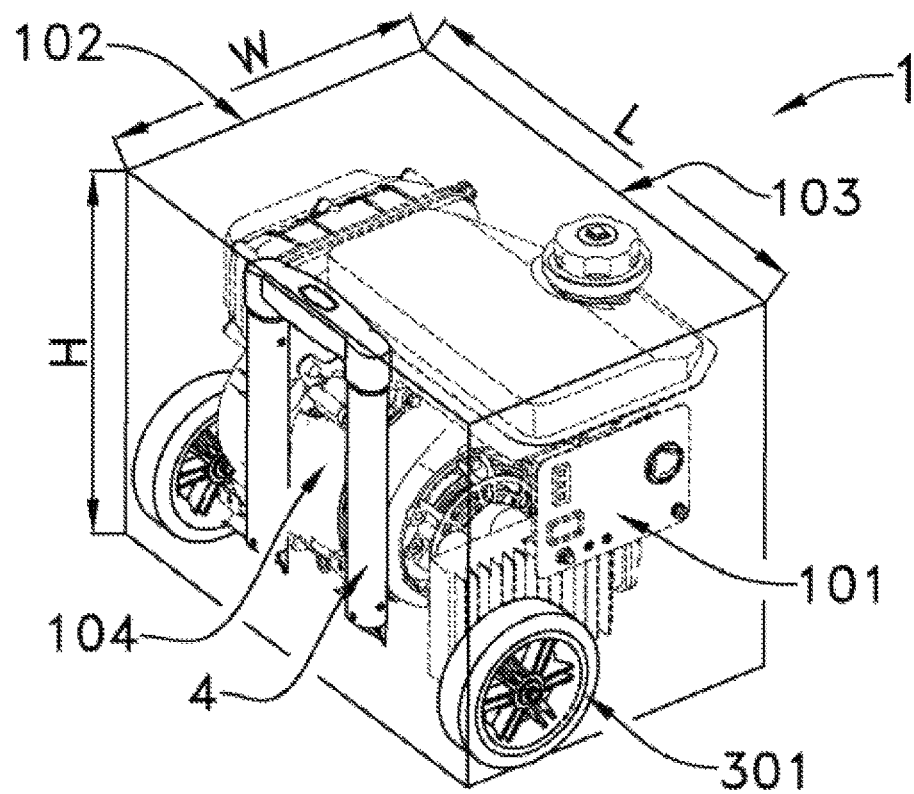
FIG. 1b is a basic outline and structure view of the generator set of the embodiment 1 of the present disclosure.
Figure 2A:
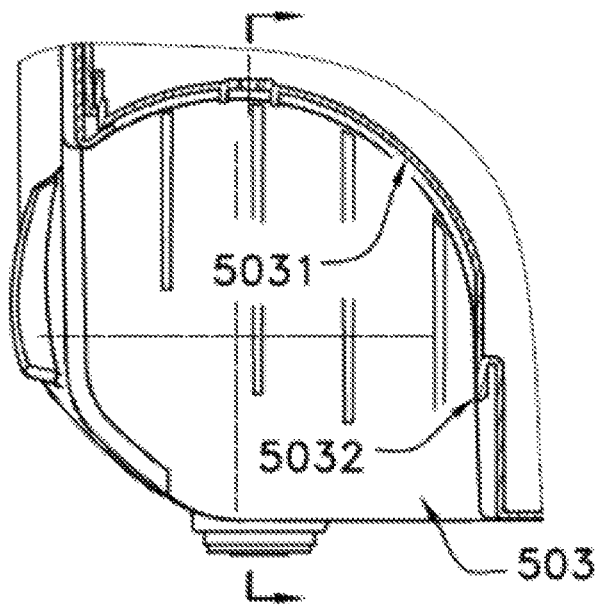
FIG. 2a and FIG. 2b are structure views of the portion where the housing is connected with the wheel device of the embodiment 1 of the present disclosure.
Figure 2B:
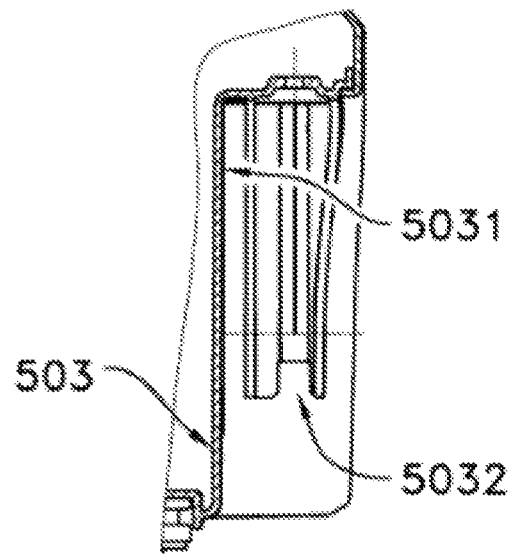
Figure 2C:
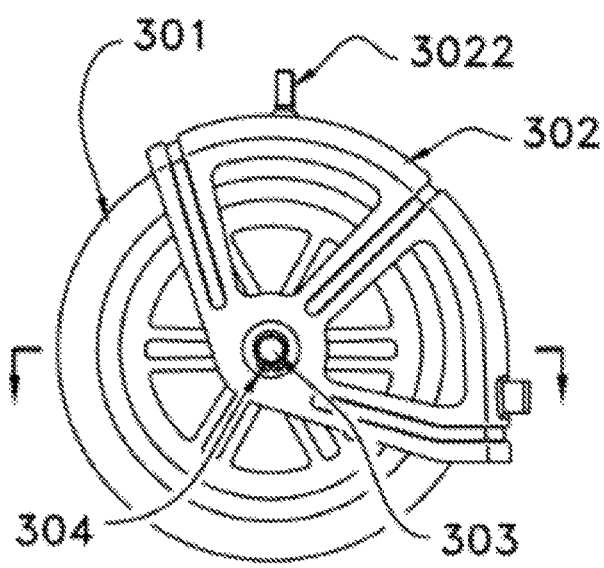
FIG. 2c, FIG. 2d and FIG. 2e are structure views of the wheel device of the present disclosure.
Figure 2D:
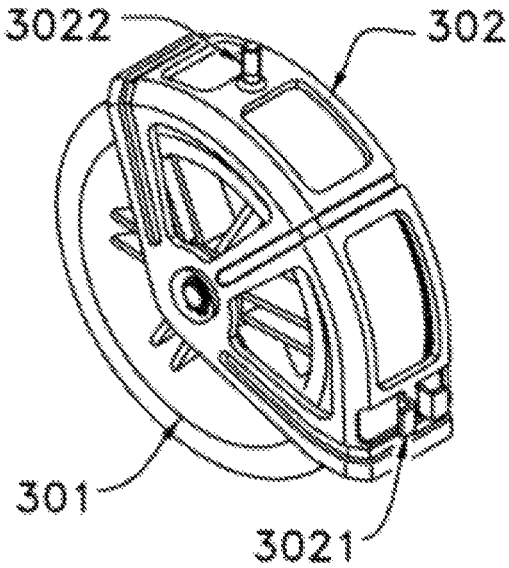
Figure 2E:
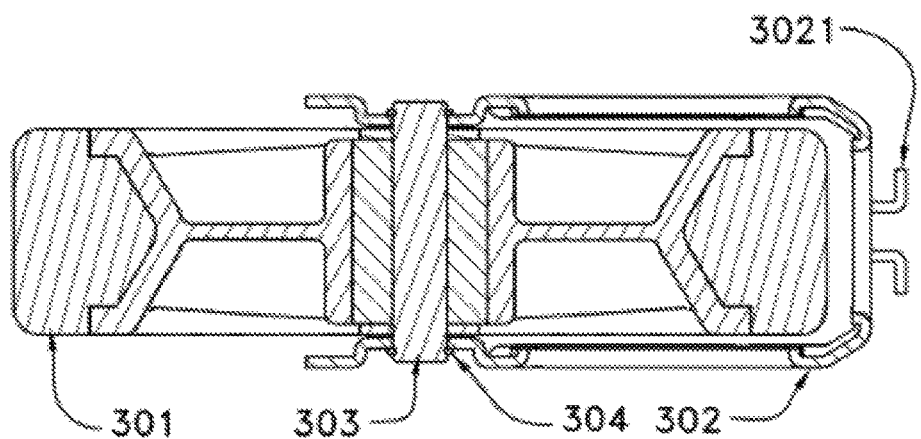
Figure 3:
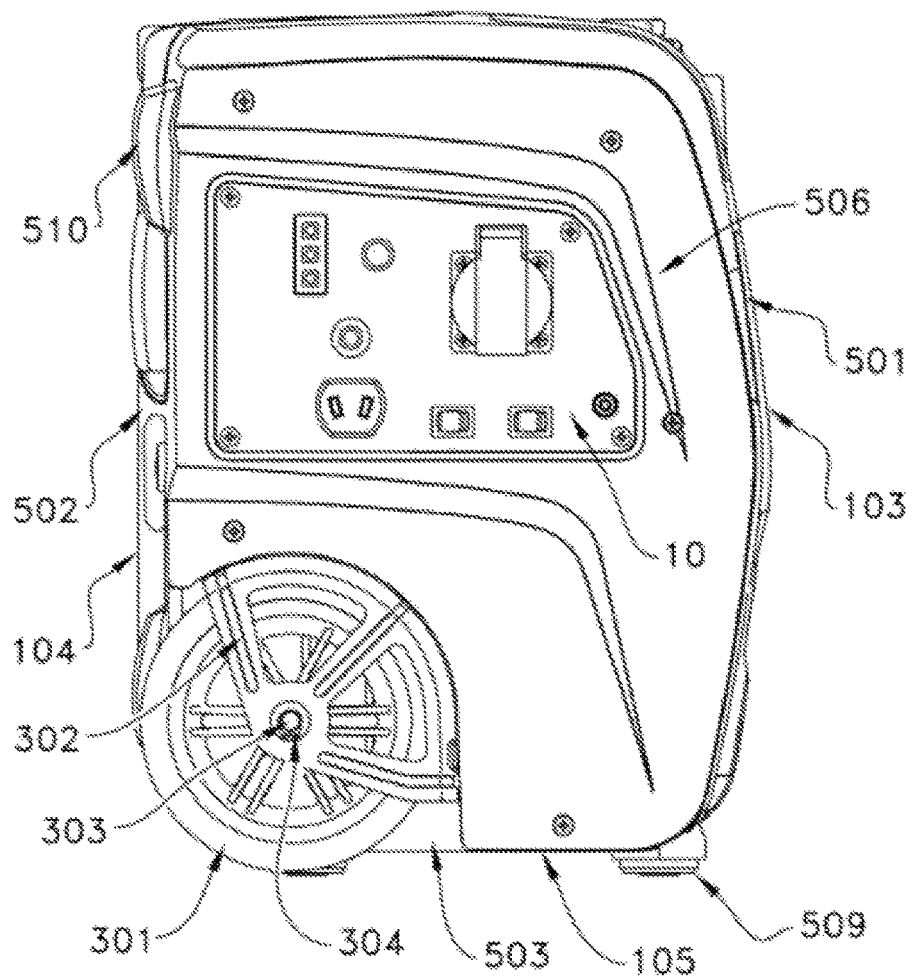
FIG. 3 is a front view of the generator set of the embodiment 1 of the present disclosure.
Figure 4:
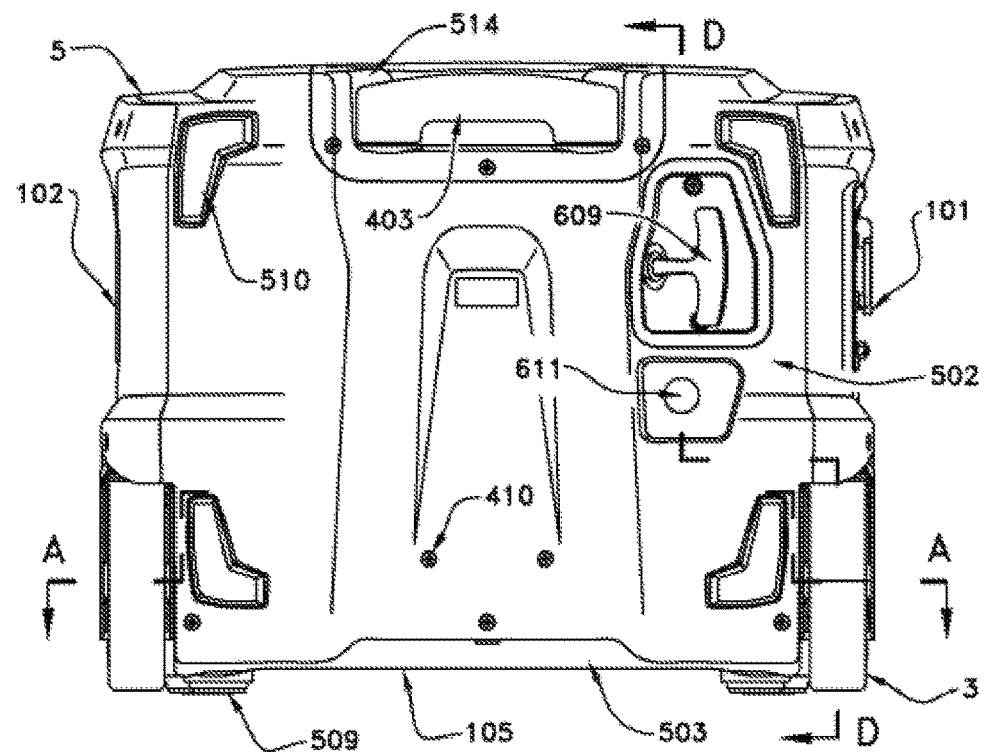
FIG. 4 is a left view of the generator set of the embodiment 1 of the present disclosure.

Description of the reference number in the figures: 1. generator set, 101. front side of generator set, 102. rear side of generator set, 103. left side of generator set, 104. right side of generator set, 105. bottom of generator set, 2. existing generator set, 201. wheel, 202. rotary pull rod, 3. wheel device, 301. wheel, 302. bracket, 3021. buckle structure, 3022. screw column, 303. wheel axle, 304. retaining ring, 305. nut, 4. pull rod device, 401. pull rod, 4011. first section pull rod, 4012. second section pull rod, 4013. third section pull rod, 402. rod cylinder, 403. handle, 404. unlock button, 410. screw, 5. housing, 501. left housing, 5011. engine oil apron, 502. right housing, 503. lower housing, 5031. concave structure, 5032. groove, 504. maintenance cover, 5041. engine oil maintenance cover, 5042. engine oil apron, 505. air inlet, 506. electrical box, 507. rear window, 508. handle, 509. shock absorption foot, 510. foot pad, 511. long screw, 512. inlet cover, 513. spark plug maintenance cover, 514. connection cover, 6. engine, 601. crankcase, 602. crankcase cover, 6021. oil-filling port, 603. crankshaft, 604. flywheel, 605. fan, 606. wind shroud, 607. air filter, 608. hand starter, 609. starting handle, 610. drawstring, 611. damper handle, 7. generator, 701. motor air inlet, 702. motor air inlet cover, 703. motor fan, 8. fuel tank, 901. fuel tank port, 802. fuel tank cap, 803. rubber seal ring, 804. fuel tank port cover, 805. fuel tank housing, 806. fuel tank port neck, 807. fuel tank port bottom surface, 808. fuel tank top surface, 809. hollow cavity, 810. fuel level, 9. fuel switch, 901. fuel switch knob, 10. electrical panel, 11. inverter, 12. inverter shell.

DETAILED DESCRIPTION

The present disclosure will be described in detail with reference to the drawings and embodiments below.

The present disclosure provides two embodiments.

1. Embodiment 1

As shown in FIG. 1b to FIG. 18, a portable generator set 1 of the present disclosure may mainly include an engine 6, a generator 7, a fuel tank 8, an inverter 11, wheels 3, a pull rod device 4, a housing 5 and an electrical panel 10.

Figure 8:
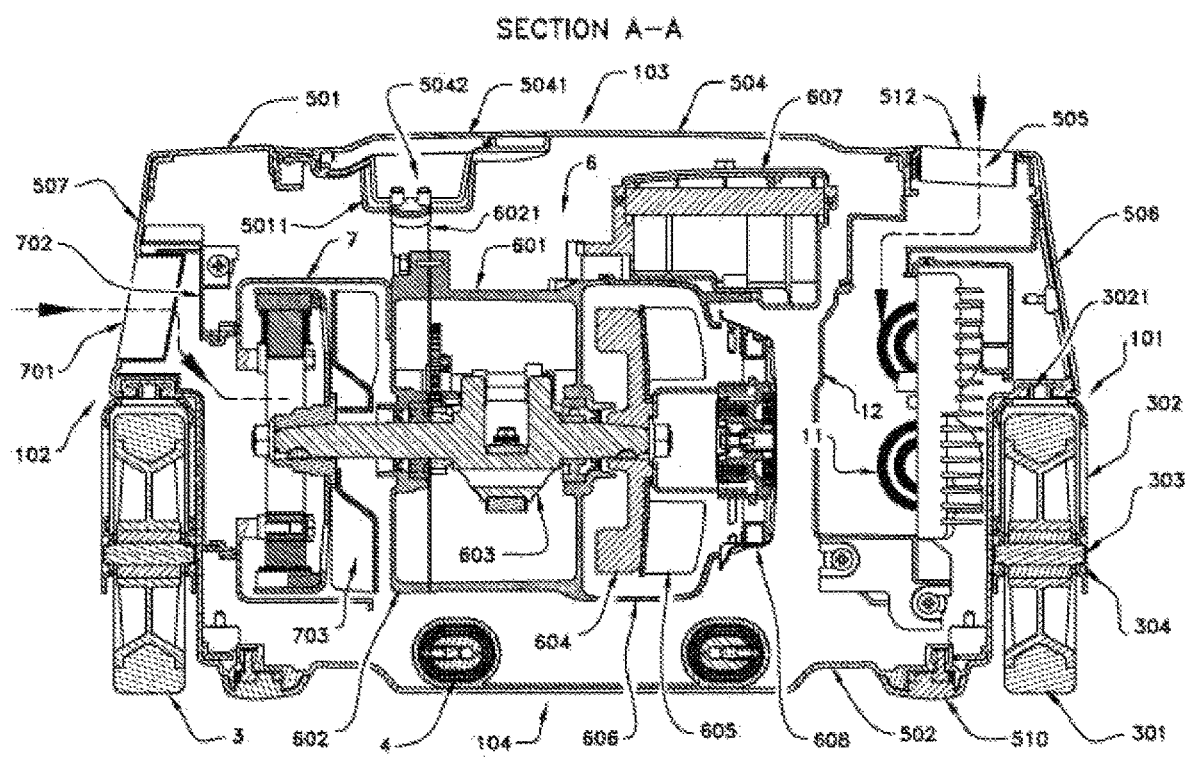
FIG. 8 is an A-A cross-sectional view of the generator set of the embodiment 1 of the present disclosure.
Figure 9:
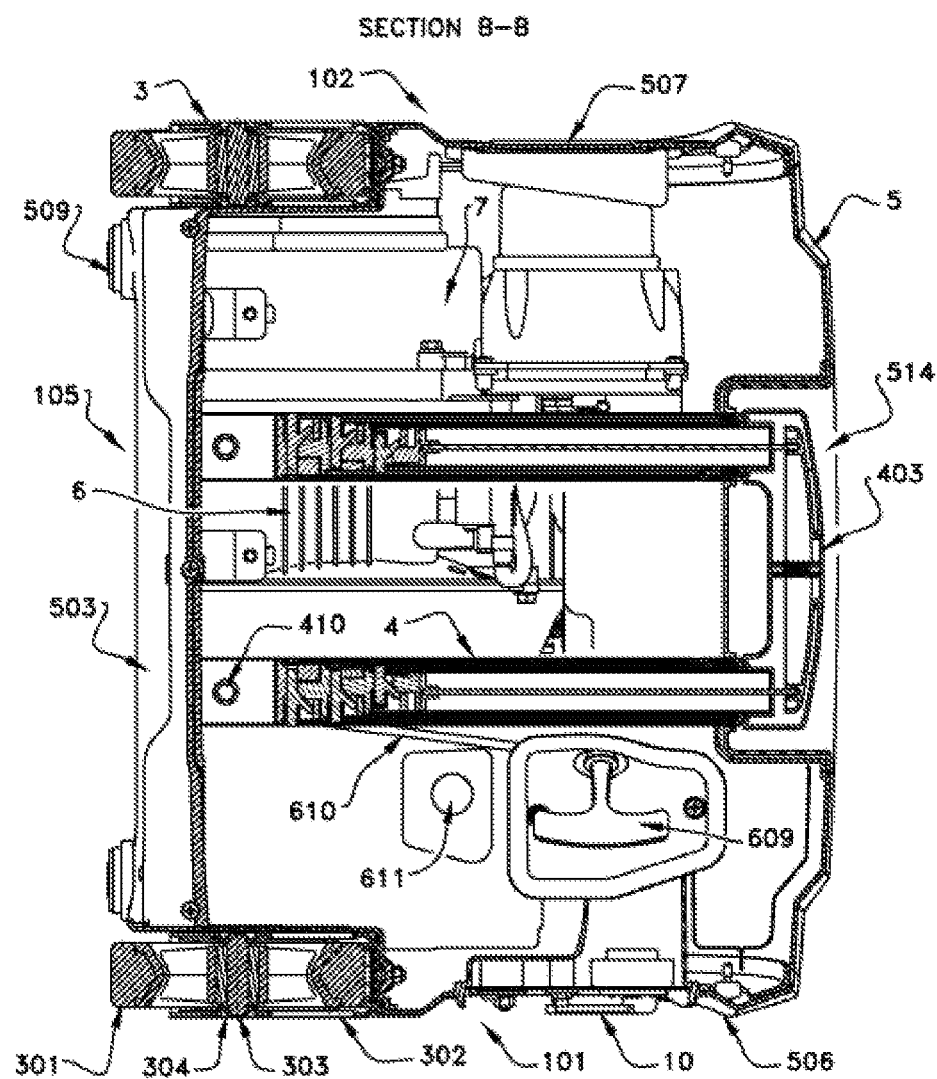
FIG. 9 is a B-B cross-sectional view of the generator set of the embodiment 1 of the present disclosure.
Figure 10:
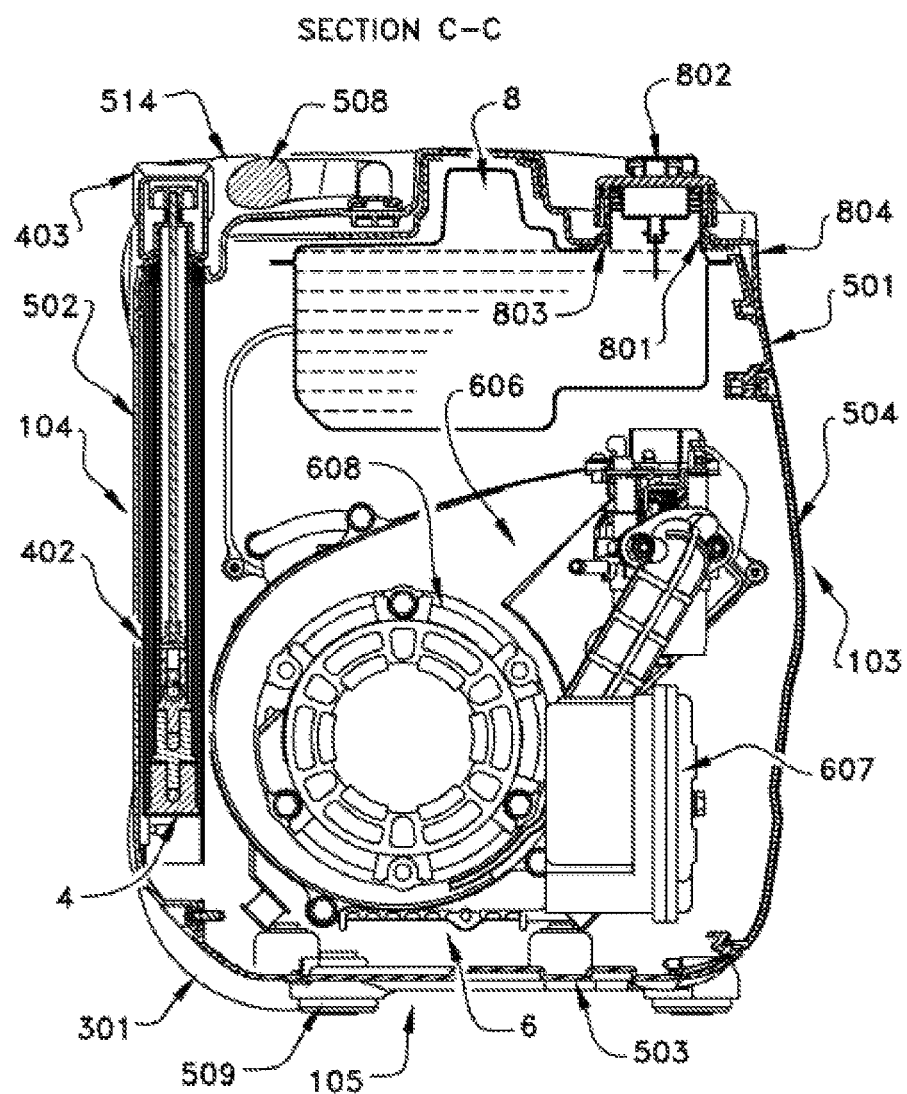
FIG. 10 is a C-C cross-sectional view of the generator set of the embodiment 1 of the present disclosure.

As shown in FIG. 8 and FIG. 10, in the present embodiment, the engine 6 may be a tilt cylinder engine. The cylinder head of the engine 6 may be tilted toward a left side 103 of the generator set. The multi-pole permanent magnet generator 7 may be arranged at the rear of the engine and connected with an output end at the rear of an engine crankshaft, and therefore be a rear-mounted generator. Based on needs, a vertical cylinder engine may also be used, and a front-mounted generator may be used so as to reduce the width W of the generator set. The inverter 11 may be arranged at the front of the engine, and used to convert medium frequency alternating current outputted by the multi-pole permanent magnet generator 7 into power frequency alternating current with stable voltage.

As shown in FIG. 1b to FIG. 18, the contour of the generator set 1 may be designed as a shape occupying a cuboid space whose length L is larger than or equal to its width W. The engine 6, the generator 7 and the fuel tank 8 may be accommodated in the housing 5. The engine 6 may be connected with the housing 5 at the bottom of the generator set. The width W and the height H of the cuboidal structure of the generator set 1 may form the front side 101 and the rear side 102 of the generator set, the length L and the height H may form the left side 103 and the right side 104 of the generator set, and the length L and the width W may form the bottom 105 and the top of the generator set.

As shown in FIG. 10, 12, 13 and FIG. 14, in the present disclosure, the fuel tank 8 may be arranged at an upper portion of the engine 6. The fuel tank 8 may mainly include a fuel tank housing 805, a fuel tank port 801, a fuel tank cap 802 and a fuel tank top surface 808. In order to prevent the fuel in the fuel tank 8 from leaking through the fuel tank port 801 after the generator set 1 is fallen down, a hollow cavity 809 may be arranged at the inner side of the fuel tank top surface 808. In the present embodiment, the fuel tank top surface 808 may be higher than the bottom surface 807 of the fuel tank port when the generator set 1 is placed vertically. When the generator set 1 is reclined towards the right side 104 of the generator set and fallen down, the fuel in the fuel tank 8 may enter into the hollow cavity 809 such that the fuel level 810 in the fuel tank 8 after reclining and falling can be reduced. Because the hollow cavity 809 at the top of the fuel tank in the present disclosure may have a large volume, the fuel level 810 in the fuel tank 8 after the generator set 1 is reclined will be lower than the fuel tank port 801, thereby ensuring that the fuel cannot leak through the fuel tank port 801.

The fuel tank 8 of the present disclosure may further include a fuel tank port neck 806 and a fuel tank port bottom surface 807. The fuel tank port neck 806 may be a passage which is formed by extending upward from the fuel tank port bottom surface 807 and by which the fuel enters into or exits from the fuel tank. The external opening of this passage may form the fuel tank port 801. When the generator set 1 is placed vertically, the fuel tank top surface 808 in the present disclosure is higher than the fuel tank port bottom surface 807 so as to ensure that the hollow cavity 809 at the top of the fuel tank has enough volume.

As shown in FIG. 3 to FIG. 18, four shock absorption feet 509 may be arranged on the bottom of a lower housing 503 of the generator set. When the generator set 1 is reclined and fallen toward the left side 103 or the right side 104, the weight of the generator set 1 may be supported by foot pads 510. In a working state, the generator set 1 is placed vertically, and at this time the generator set 1 may be supported by the shock absorption feet 509. The generator set 1 of the present disclosure may be allowed to be reclined toward the right side 104 in a non-working state. To this end, four foot pads 510 may be arranged on a side of a right housing 502 of the generator set. When the generator set 1 is reclined toward the right side 104, the foot pads may be used to support the weight of the generator set 1.

As shown in FIG. 1b to FIG. 18, a pull-type pull rod device 4 may be arranged near the right side 104 of the generator set. The pull rod device 4 may be arranged along the direction of the height H of the generator set (vertical direction), i.e. the pull-out direction of the pull rod 401 of the pull rod device 4 may be consistent with the direction of the height H of the generator set. An exposed handle 403 may be arranged at the top of the pull rod device 4. A rod cylinder 402 of the pull rod device 4 may be connected with the housing 5.

As shown in FIG. 1b to FIG. 18, two wheel devices 3 may be arranged near the bottom 105 of the generator set. Each wheel device may include a wheel 301 and a wheel axle 303. Two wheels 301 may be arranged in the direction of the length L (longitudinal direction) of the generator set, i.e. the axis of the wheel 301 may be consistent with the direction of the length L of the generator set. The portions near the front side 101 and the rear side 102 of the generator set may each be provided with one wheel 301. Each wheel 301 may be connected with the bottom of the housing 5 through its bracket 302.

The wheel devices 3 and the pull-type pull rod device 4 may be arranged on the same side of the generator set 1, both near the right side 104 of the generator set.

As shown in FIG. 8 to FIG. 18, in the present disclosure, the engine 6, the generator 7 and the fuel tank 8 may be accommodated in the housing 5. The housing 5 may mainly include a left housing 501, the right housing 502 and the lower housing 503, etc. The left housing 501 may be located at the left side 103 of the generator set, the right housing 502 may be located at the right side 104 of the generator set, and the lower housing 503 may form the bottom 105 of the generator set. The bottom of the engine 6 may be connected with the lower housing 503 through a shock absorption device. The wheel devices 3 may be connected to the lower housing 503 near the bottom. The rod cylinders 402 of the pull rod device 4 may pass through openings at the top of the side of the right housing 502 from top to bottom. Ends of the two rod cylinders 402 away from the handle 403 may be connected with the right housing 502 through screws 410. The handle 403 of the pull rod device 4 may be exposed at the top of the right housing 502. One end of the rod cylinder 402 of the pull rod device 4 near the handle 403 may be connected with a connection cover 514. The connection cover 514 may be connected with the top of the housing 5.

Figure 16:
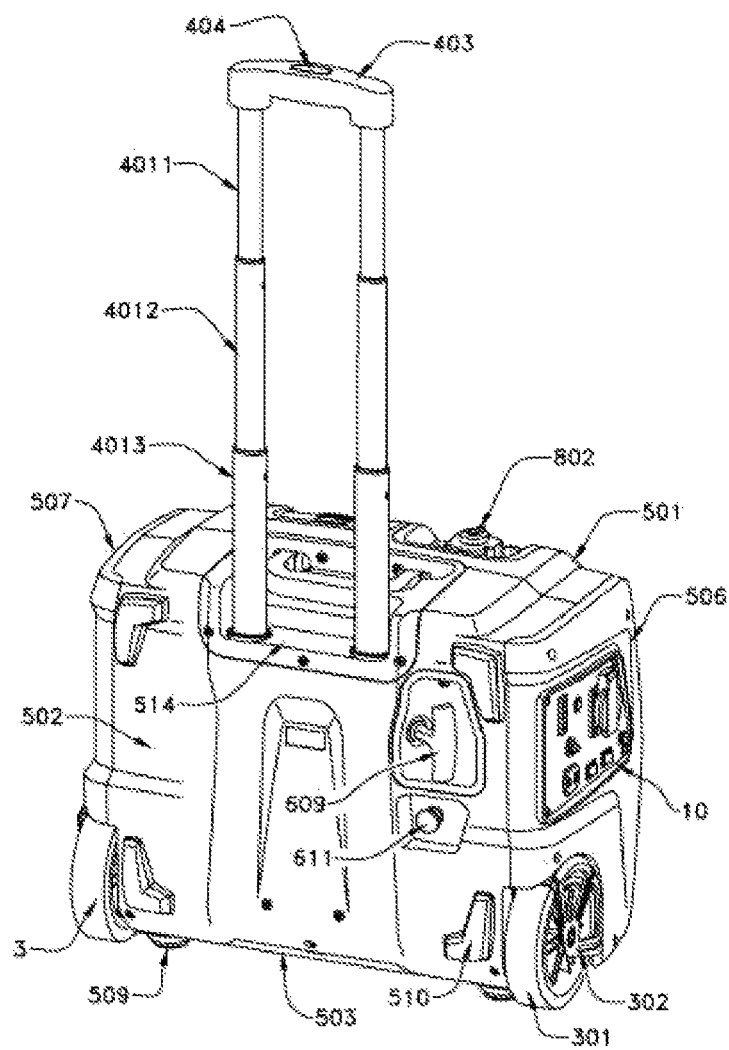
FIG. 16 is a perspective view of the generator set of the embodiment 1 of the present disclosure where the pull rod is opened.
Figure 17:
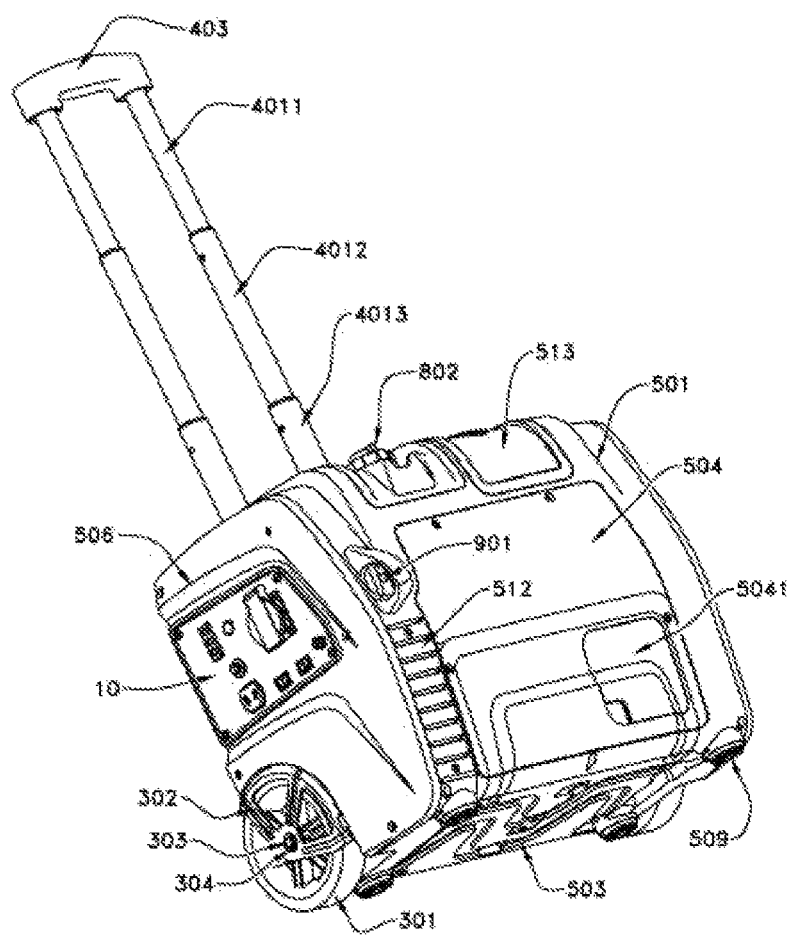
FIG. 17 is a perspective view of the generator set of the embodiment 1 of the present disclosure in a transportation state.

When the generator set 1 needs to be transported manually, the pull rod device 4 can be extended quickly and easily by holding the handle 403 of the pull rode device 4, pressing a unlock button 404 and pulling upward the handle 403. The extended pull rod device 4 may be as shown in FIG. 16. Thereafter, the generator set 1 may be reclined toward the right side 104 of the generator set on which the pull rod device 4 is arranged so as to lift up the left side 103 of the generator set to away from the ground, as shown in FIG. 17. This way, the generator set 1 can be pulled forward utilizing the pull rod device 4 and the wheel devices 3.

Since the reclining direction of the generator set 1 is consistent with the advancing direction during the transportation, the lower portion of the generator set 1 is far away from the feet and leg of the operator, and will not bump the operator. Therefore, the operator can pull forward the generator set quickly and easily. On the other hand, since in the present embodiment the axis of the wheel 301 may be arranged as being consistent with the direction of the length L of the generator set and the width W of the generator set 1 is smaller than the length L of the generator set 1, the center of gravity of the generator set 1 will be substantially above the center of the wheel 301 when the generator set is reclined toward the right side 104 so as to be pulled. Therefore, the operation is very labor-saving, and the operator can very easily transport the generator set 1, which greatly increases the portability of the generator set.

As shown in FIG. 10, 16 and FIG. 17, The pull-type pull rod device 4 may mainly include the pull rod 401, the rod cylinder 402, the handle 403 and the unlock button 404, etc. In the present embodiment, the pull rod device 4 may be a double-cylinder pull rod, and have two rod cylinders 402, i.e. have two sets of rod cylinder 402 and pull rod 401 which are arranged in parallel and symmetrically. Each set may include a three-section pull rod and a rod cylinder 402. From the first section pull rod 4011 to the third section pull rod 4013, the cross sections of the pull rod may be increased gradually. The cross section of the rod cylinder 402 may be larger than that of the third section pull rod 4013. The pull-type pull rod 401 and the rod cylinder 402 may be arranged in the order of the size of the cross sections to form a multi-level nested structure. The length of the pull rod device 4 may be adjusted by telescoping the pull rod 401 in the rod cylinder 402 or in another section of the pull rod. The pull rod 401 retracted completely may be accommodated in the rod cylinder 402. The rod cylinder 402 may be connected with the housing 5. Of course, based on needs, the pull-type pull rod device 4 of the present disclosure may also be a single-cylinder pull rod (there is only one rod cylinder) or a three-cylinder pull rod (there are three rod cylinders), etc., which may be alternatives of the present disclosure.

It can be seen from the structure and operation process of the pull-type pull rod device 4 above that, because the pull rod device 4 of the present disclosure uses the multi-section pull rod nesting telescopic structure, it will be very easy to make the length of the pull rod device 4 in opening state longer, which leads to that the operation will be more labor-saving. On the other hand, the pull-type pull rod device 4 can be extended and retracted quickly, which leads to great convenience and high efficiency in operation. Furthermore, the completely retracted pull rod 401 does not occupy space, which enables more compact portable generator set.

As shown in FIG. 1b to FIG. 18, the front side 101 and the rear side 102 of the generator set may each be provided with one wheel device 3. The wheel device 3 may be arranged near the right side 104 of the generator set. In the present embodiment, the wheel devices 3 may be connected with the lower housing 503. The wheel device 3 may mainly include the wheel 302, the bracket 302, a buckle structure 3021, a screw column 3022, the wheel axle 303, a retaining ring 304 and a nut 305. Each of the two wheel devices 3 may have its own wheel axle 303, and there is no wheel axle between the two wheel devices 3. The wheel 301 of the wheel device 3 may be arranged in its bracket 302. Two sides of the bracket 302 may respectively be connected with two ends of its wheel axle 303. The wheel axle 303 may pass through the bracket 302 and the wheel 301 to connect them together. The two ends of the wheel axle 303 may each be provided with one retaining ring 304 for limiting. The retaining ring 304 may be arranged in a recess on the outside of the bracket 302. The bracket 302 may be arranged in a concave structure 5031 on the bottom of the lower housing 503, and be connected with a groove 5032 on the bottom of the lower housing 503 through its buckle structure 3021. The top of the bracket 302 may be provided with the screw column 3022. The screw column 3022 may pass through the opening on the bottom of the lower housing 503 from bottom to top. The nut 305 above the opening may be connected with the screw column 3022, thereby connecting the bracket 302 and the lower housing 503 together.

In the existing generator set 2, the two wheels 201 share one wheel axle. Two ends of the wheel axle are connected with two wheels 201, while the middle portion passes through the entire housing. The wheel axle occupying the inside of the housing will waste a lot of space. This also limits the diameter of the wheel to not be large. However, there will be large resistance force between the wheel with small diameter and the ground. Therefore, when the generator set is transported, there will be large advance resistance, and the wheel will have poor adaptability to the road conditions. Furthermore, since the wheel axle is near the ground, the generator set will have poor passing ability during the transportation. While in the present disclosure, each wheel 301 may have its own wheel axle 303, two ends of each wheel axle 303 may be supported by its bracket 302, and the two wheel axles 303 need not to be connected together. Therefore, there is no wheel axle within the housing 5, and no internal space of the housing will be wasted. Accordingly, the wheel with larger diameter can be used, which greatly increases the adaptability of the wheel to various road conditions, and reduces the advance resistance acting on the wheel during the transportation of the generator set. Furthermore, large diameter wheel can also increase the passing ability.

The fuel tank 8 may be arranged near the top of the engine 6, and the exposed fuel tank port 801 and the fuel tank cap 802 may be arranged on the tope of the generator set 1 and at a different side from the pull rod device 4, as shown in FIG. 1b to FIG. 18. In the present embodiment, the pull rod device 4 may be arranged on the right side 104 of the generator set. Therefore, the fuel tank port 801 and the fuel tank cap 802 may be arranged on the left housing 501 at the left side 103 of the generator set. In order to prevent the fuel from flowing out of the fuel tank port 801 when the generator set 1 is reclined toward the right side 104, and prevent the splashed fuel when filling the fuel into the fuel tank port 801 from polluting the pull rod device 4, the positions of the fuel tank port 801 and the fuel tank cap 802 may be as far as possible from the handle 403 of the pull rod device 4. Accordingly, in the present embodiment, the fuel tank port 801 and the fuel tank cap 802 may be arranged at the outermost side of the left housing 501. As shown in FIG. 10, the neck of the fuel tank port 801 may be provided with a fuel tank port cover 804. A protruding edge may be arranged around the fuel tank port cover 804 so as to concentrate the splashed fuel. A fuel outflow gap may be arranged at outside of the protruding edge so as to prevent the fuel in the fuel tank port cover 804 from flowing unrestricted when it overflows. A rubber seal ring 803 may be arranged between the fuel tank port neck 806 and the fuel tank port cover 804 so as to prevent the fuel in the fuel tank port cover 804 from flowing into the housing 5 through the fuel tank port neck 806.

The engine 6 may be started with a hand starter 608. A drawstring 610 may be wrapped around an outer edge of a pull plate in the hand starter 608. One end of the drawstring 610 may be connected with the pull plate, and the other end may be connected with a starting handle 609. The engine 6 may be started by holding the starting handle 609 and pulling the pull plate to rotate. The starting handle 609 may be arranged at the same side to the pull rod device 4. As shown in FIG. 4, FIG. 8, FIG. 9 and FIG. 11, in the present embodiment, the pull rod device 4 may be arranged at the right side 104 of the generator set. Therefore, the starting handle 609 may also be arranged at the right side 104 of the generator set. In order to facilitate starting the engine 6 by pulling manually, the starting handle 609 may be arranged near the handle 403 of the pull rod device 4, such that when starting the other hand can hold the handle 403 so as to stabilize the generator set 1.

The generator set 1 may be provided with the electrical panel 10. As shown in FIG. 3, FIG. 11, FIG. 15 and FIG. 18, in the present embodiment, the electrical panel 10 may be arranged at the front side 101 of the generator set. The electrical panel 10 may mainly include a panel, various output sockets, switches, indicator lights, signal jacks and ground terminals, etc. The electrical panel 10 may be arranged within an electrical box 506. In the present embodiment, the electrical box 506 may form the front portion of the housing 5, which may be connected with the left housing 501, the right housing 502 and the rear side of the lower housing 503.

A handle 508 may be arranged at the top of the generator set 1. The handle 508 may be located between the handle 403 of the pull rod device 4 and the fuel tank cap 802. In the present embodiment, the handle 508 may be mounted on the bottom of the connection cover 514. The connection cover 514 may be connected with the top of the housing 5, and the handle 508 may be used to lift the generator set during the transportation. The handle 508 of the present embodiment may, when in use, be rotated upward around a root shaft thereof. The handle may be exposed at the top of the housing 5 for gripping. When not in use, the handle 508 may be automatically retracted downward under the action of spring force to be hidden in a concave structure of the connection cover so as to not occupy the storage space of the generator set. Of course, the handle 508 may also be designed as a fixed element which is not able to be rotated. In this case, the handle 508 may be made integrally with the housing 5, or be made as a separate component which will be assembled with the housing. Such designs have been utilized in other embodiments of the present disclosure. In order to increase the comfort when gripping the handle 508, a grip portion of the handle 508 may be covered by soft materials, such as TPE, rubber or PVC, etc.

A damper handle 611 may be arranged at the same side to the starting handle 609. As shown in FIG. 4, FIG. 9, FIG. 11 and FIG. 15, in the present embodiment, the starting handle 609 may be arranged on the right housing 502. Therefore, the damper handle 611 may also be arranged on the right housing 502. The damper handle 611 may be connected with a damper in a carburetor by a drawstring. The damper of the carburetor may be closed or opened by pulling the damper handle 611. When starting the engine 6 in a cold state, it is generally necessary to close the damper. After the engine 6 is started, the damper needs to be opened in time. Therefore, the damper handle 611 and the starting handle 609 may be arranged together so as to facilitate the starting of the engine 6.

Figure 5:
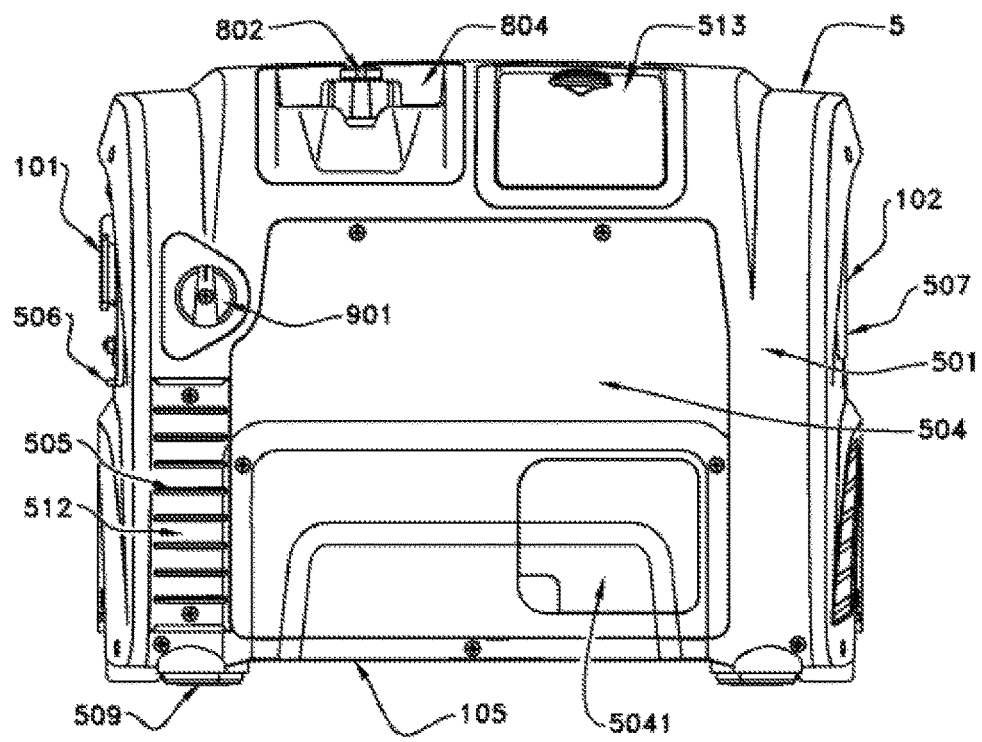
FIG. 5 is a right view of the generator set of the embodiment 1 of the present disclosure.
Figure 6:
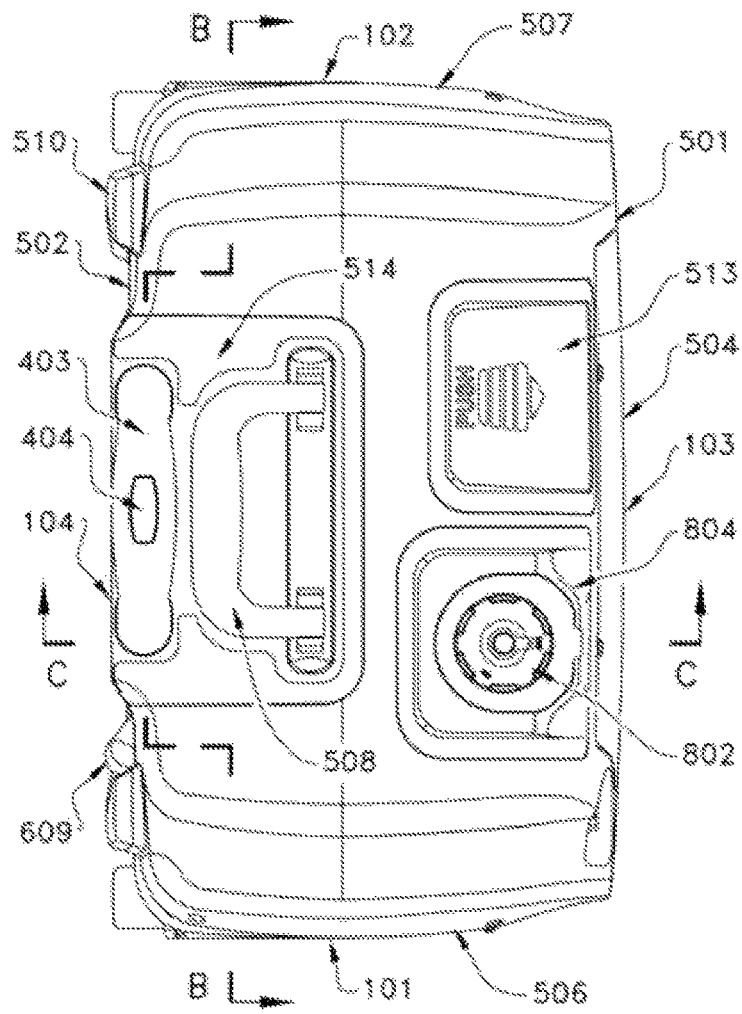
FIG. 6 is a top view of the generator set of the embodiment 1 of the present disclosure.
Figure 11:
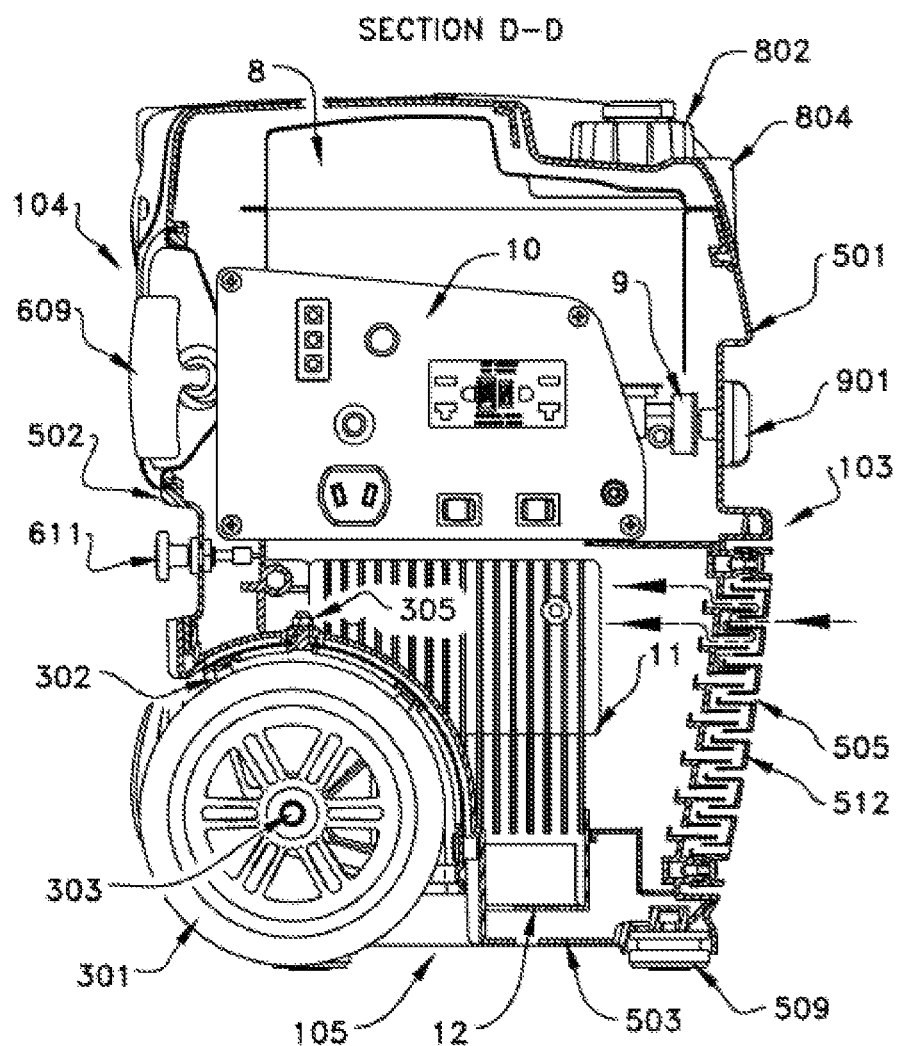
FIG. 11 is a D-D cross-sectional view of the generator set of the embodiment 1 of the present disclosure.

A fuel switch 9 and its knob 901 may be arranged at the same side to the fuel tank port 801 and the fuel tank cap 802, and the fuel switch 9 may be arranged below the fuel tank port 801. As shown in FIG. 5, FIG. 11 and FIG. 17, in the present embodiment, the fuel tank port 801 and the fuel tank cap 802 may be arranged on the left housing 501. Accordingly, the fuel switch 9 may also be arranged on one side of the left housing 501 so as to shorten the fuel line between the fuel switch 9 and the fuel tank 8 and facilitate simplifying the assembly process. The fuel switch knob 901 may be connected with the fuel switch 9. A fuel inlet of the fuel switch 9 may be connected with the fuel tank 8, and the fuel outlet may be connected with the carburetor of the engine. The fuel switch 9 may be used to cut off or switch on the fuel line between the fuel tank 8 and the carburetor.

A maintenance cover 504 may be arranged on the left housing 501, as shown in FIG. 5, FIG. 8, FIG. 17 and FIG. 18. Changing the engine oil of the engine 6, cleaning the air filter 607, repairing the carburetor or the like can be performed by opening the maintenance cover 504 without removing the housing 5 of the generator set. In order to prevent the engine oil from leaking from an engine oil-filling port 6021 into the bottom of the housing when opening the maintenance cover 504 to fill or change the engine oil of the engine, an engine oil apron 5011 may be arranged on the left housing 501 below the engine oil-filling port 6021. As shown in FIG. 8, in the present embodiment, the characteristic may be that a separate engine oil maintenance cover 5041 may be further arranged on the maintenance cover 504. Since the engine oil maintenance cover 5041 can be opened and closed quickly, the engine oil can be conveniently filled or changed without opening the maintenance cover 504. In order to prevent the engine oil from leaking from the engine oil-filling port 6021 into the bottom of the housing when opening the engine oil maintenance cover 5041 to fill or change the engine oil of the engine, an engine oil apron 5042 may also be arranged on the maintenance cover 504 below the engine oil-filling port 6021.

As shown in FIG. 5, FIG. 8 and FIG. 11, an air inlet 505 may be provided below the left side 103 of the generator set. In the present embodiment, the air inlet 505 may be arranged on an inlet cover 512. The inlet cover 512 may be arranged outside the left housing 501 and connected with the left housing 501 by screws. The external air may enter the generator set 1 through the air inlet 505, thereby providing fresh air for engine operation and generator set cooling. A labyrinth structure may be arranged between the inlet cover 512 and the left housing 501 so as to prevent internal noise of the generator set from leaking out through the air inlet 505, thereby reducing external noise of the generator set.

As shown in FIG. 8 and FIG. 11, the inverter 11 may be arranged in the housing 5 of the generator set 1. The inverter 1 may be arranged at front of the engine 6. An inverter shell 12 may be disposed between the inverter 11 and the air inlet 505 of the housing 5. The heat sink and the heat generating components on the inverter 11 may be housed in the inverter shell 12. An intake port may be arranged at one end of the inverter shell 12. The intake port may be connected and communicated with the air inlet 505. The air from the air inlet 505 may cool the inverter 11 taking the inverter shell 12 as a passage, and then the air may flow through the engine 6 to cool it. An outtake port may be arranged on the inverter shell 12 near the air filter 607 of the engine. The cold air before cooling the inverter can preferentially enter the air filter 607 to provide fresh air for the engine combustion work, thereby improving the high temperature dynamic performance of the generator set.

Figure 7:
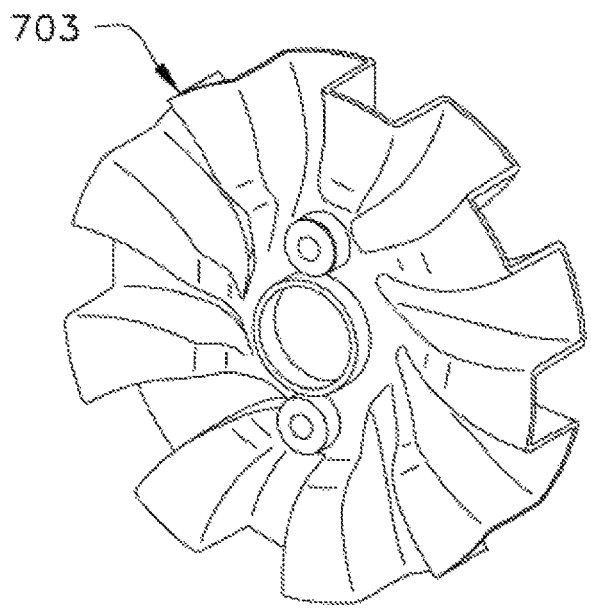
FIG. 7 is a perspective view of the motor fan used by the generator set of the embodiment 1 of the present disclosure.
Figure 18:
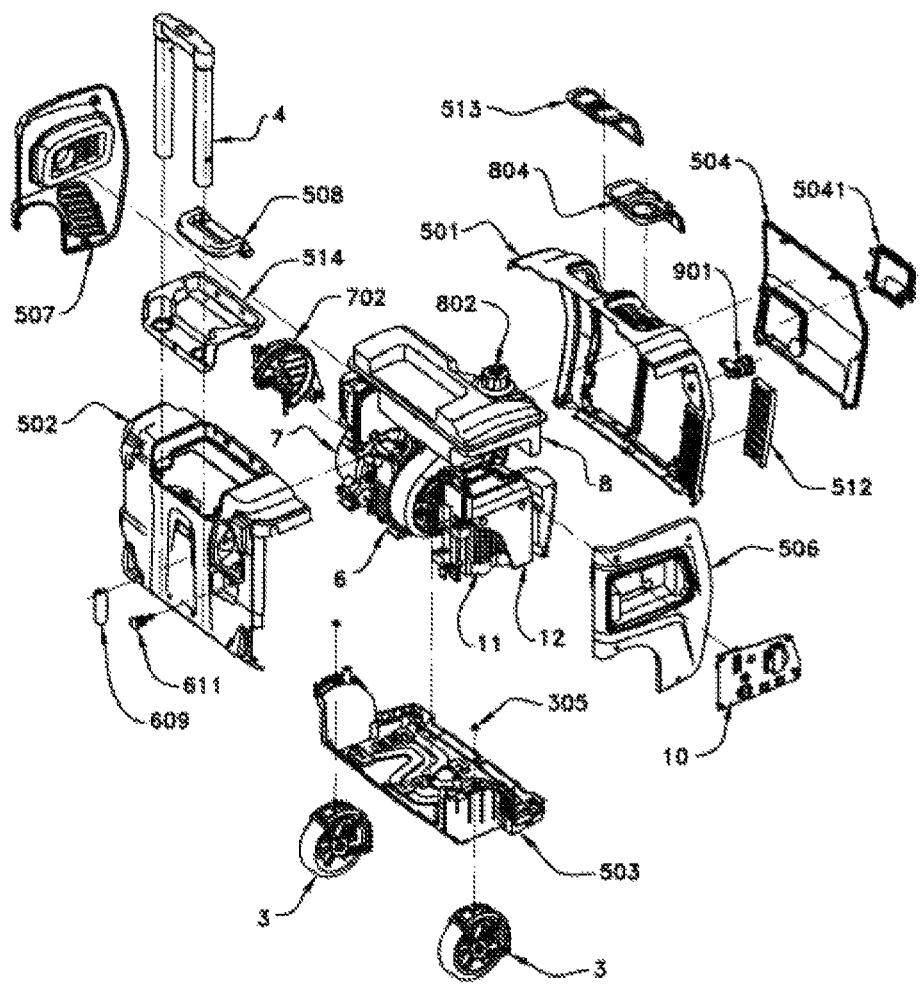
FIG. 18 is an explosion view of the generator set of the embodiment 1 of the present disclosure.
Figure 19:
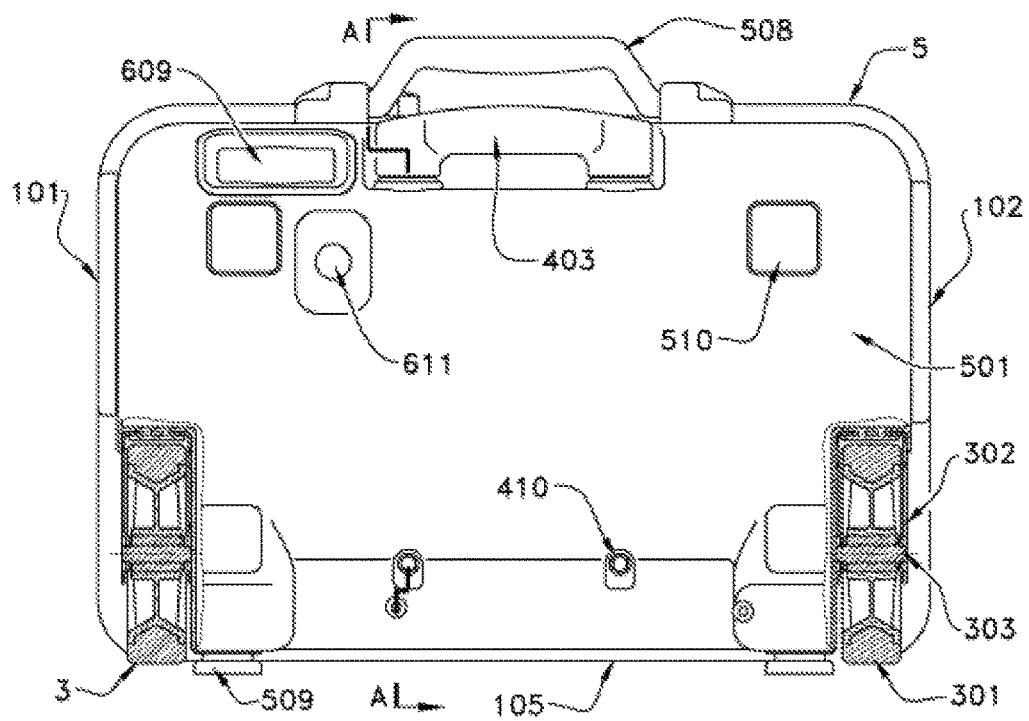
FIG. 19 is a right view of the generator set of the embodiment 2 of the present disclosure.
Figure 20:
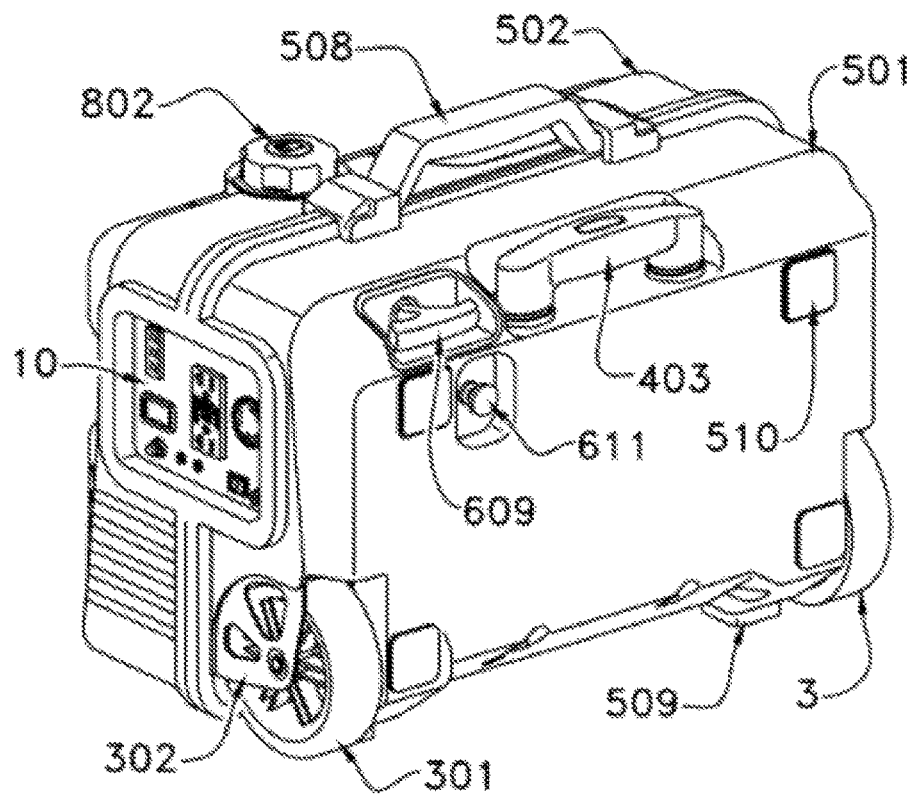
FIG. 20 is a perspective view of the generator set of the embodiment 2 of the present disclosure.

As shown in FIG. 5, FIG. 8 and FIG. 18, a rear window 507 may be arranged on the rear side 102 of the generator set. In the present embodiment, the rear window 507 may form the rear portion of the housing 5. The rear window 507 may be connected with the rear sides of the left housing 501, the right housing 502 and the lower housing 503. The upper portion of the rear window 507 may be the discharge window of the engine exhaust gas and the generator set cooling gas, and the lower portion may be the air inlet 701 of the generator 7. In order to prevent the noise of the generator set from leaking through the motor air inlet 701, a motor air inlet cover 702 may be arranged inside the rear window 507, and a labyrinth structure may be arranged therebetween. Driven by a motor fan 703, external air may enter from the motor air inlet 701 through the motor air inlet cover 702 into the generator 7 and cool it. In order to improve the cooling effect of the generator set 1, the generator of the present disclosure may utilize a special motor fan 703 which is a "bladeless" double-sided centrifugal fan, as shown in FIG. 7.

In summary, the generator set of the present embodiment may utilize the fuel tank 8 provided with the hollow cavity 809 at the top thereof, and may be provided with the foot pads 510 at the right side 104 thereof, so as to ensure that the fuel in the fuel tank 8 will not leak from the fuel tank port 801 when the generator 1 is reclined toward the right side of the generator set, thereby greatly increasing the safety and facilitate the transportation and storage of the generator set. In addition, in the present disclosure, the pull-type pull rod device 4 and the wheel devices 3 may be arranged near the right side 104 of the generator set, the axis of the wheels 301 of the wheel device 3 may be arranged as being consistent with the direction of the length (L) of the generator set, and the compact large diameter wheels may be used. Therefore, the efficiency and safety for transporting the generator set are greatly increased, the burden for manually transporting the generator set is significantly reduced, and excellent portability can be obtained by the generator set. Based on this, in the present disclosure, a series of optimized designs may be made for the generator set housing 5, the fuel tank port 801, the starting handle 609, the heat dissipation structure of the inverter, the damper handle 611 and the fuel switch 9, etc., and the operation interface may be improved, thereby further increasing the product value.

2. Embodiment 2

Compared with the embodiment 1, the main differences of the embodiment 2 are as the following.

The structures of the housing 5 are different. As shown in FIG. 19 to FIG. 22, in the present embodiment, the housing 5 may include the left housing 501 and the right housing 502. There is no separate lower housing. The maintenance cover 504 may be arranged on the right housing 502, and the air inlet 505 of the generator set 1 may also be arranged on the right housing 502. The left housing 501 and the right housing 502 may each be provided with two shock absorption feet 509 at the bottom thereof. Four foot pads 510 may be arranged on the side of the left housing 501.

Figure 21:
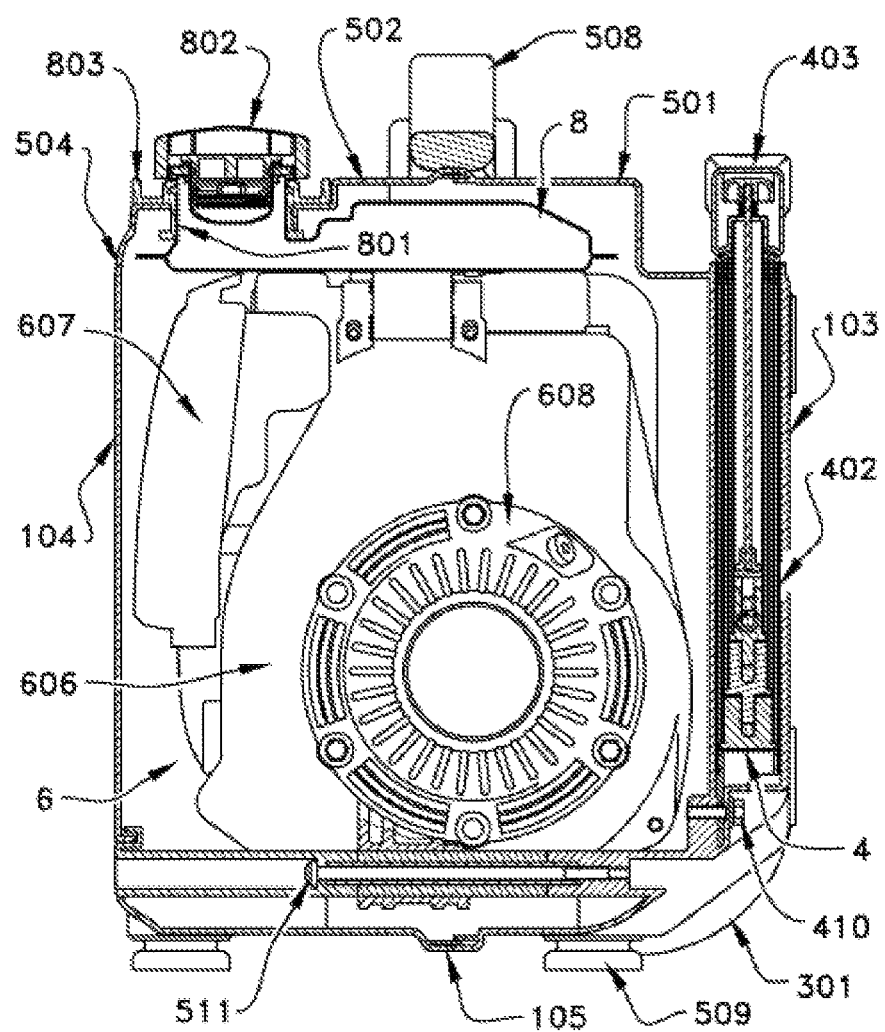
FIG. 21 is an A-A cross-sectional view of the generator set of the embodiment 2 of the present disclosure.
Figure 22:
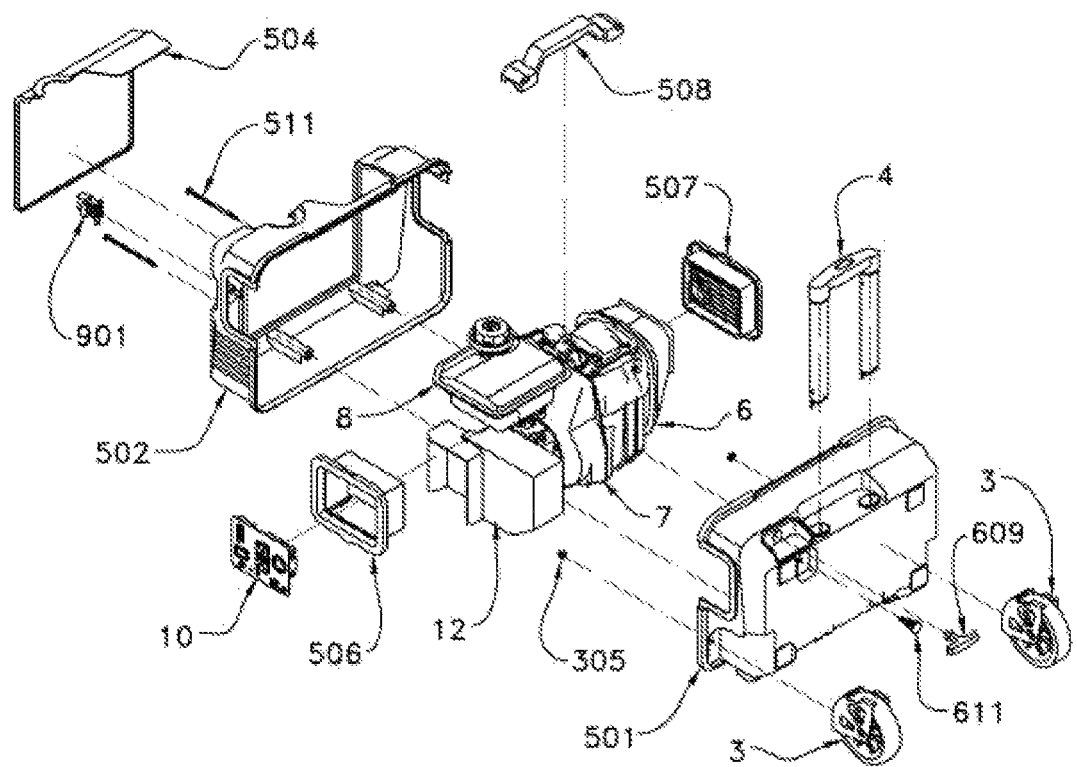
FIG. 22 is an explosion view of the generator set of the embodiment 2 of the present disclosure.

The connections between the engine 6 and the housing 5 are different. As shown in FIG. 21 and FIG. 22, in the present embodiment, two connection holes may be arranged in parallel at the bottom of the engine 6. Sleeve cylinders may be arranged in the connection holes. Rubber sleeves may be arranged between the sleeve cylinders and the rubber sleeves so as to absorb shock. One end of the sleeve cylinder may be inserted into a positioning hole at the bottom of the left housing 501, and the other end may be inserted into a positioning hole at the bottom of the right housing 502. Long screws 511 may successively pass through the right housing 502, the sleeve cylinder and the left housing 501 to connect the left housing 501, the right housing 502 and the engine 6 together.

Locations of the main components are different. As shown in FIG. 19 to FIG. 22, in the present embodiment, the foot pads 510 may be arranged at the side of the left housing 501 of the generator set. When the generator set 1 is reclined toward the left side 103, the foot pads 510 may be used to support the weight of the generator set 1. In the present embodiment, the pull rod device 4 and the wheel devices 3 may all be arranged at the left side 103 of the generator set and connected with the left housing 501. The wheel devices 3 may be arranged in a concave structure at the bottom of the left housing 501, and the starting handle 609 and the damper handle 611 may also both be arranged on the left housing 501.

As shown in FIG. 21, in the present embodiment, the fuel tank port 801 and the fuel tank cap 802 may be arranged at the top of the right housing 502 at the right side 104 of the generator set. The neck of the fuel tank port 801 may be sandwiched between the maintenance cover 504 and the right housing 502. The fuel switch knob 901 may also be arranged on the right housing 502.

The connections between the handle 508 and the housing 5 are different. As shown in FIG. 19 to FIG. 22, the handle 508 of the present disclosure may be fixedly connected with the housing 5. The handle 508 may be made integral with the housing 5, or may be assembled as a separate component with the housing 5. In order to increase the comfort when gripping the handle 508, the grip portion of the handle 508 may be covered by soft materials, such as TPE, rubber or PVC, etc.

The structures of the engine 6 and the generator 7 are different. As shown in FIG. 21 and FIG. 22, in the present embodiment, the engine 6 may be a vertical cylinder engine. The multi-pole permanent magnet generator 7 may be arranged at front of the engine 6 and connected with the output end at the front of the engine crankshaft, which belongs to front-mounted generator.

The main advantage of the present embodiments is that the structure of the housing 5 is simple, and there is no lower housing, which is advantageous for reducing the cost. Furthermore, the engine with vertical cylinder can help to reduce the width (W) of the generator set.

Principles of the Present Disclosure

In the present disclosure, as shown in FIG. 16, when the generator set 1 needs to be transported manually, the pull-type pull rod device 4 can be opened quickly by pressing the unlock button 404 and pulling upward the handle 403. Thereafter, the operator can grip the handle 403 on the pull rod and recline the generator set 1 toward the side at which the pull rod device 4 is arranged. In this case, since the reclining direction of the generator set 1 is consistent with the advance direction thereof, the bottom of the generator 1 is far away from the feet and legs of the operator and will not bump the operator, thereby ensuring that the operator can pull forward the generator set quickly and safely. Furthermore, when the preferred solution is used, since the width (W) of the generator set 1 is smaller (smaller than the length L), the center of gravity of the generator set 1 is located substantially directly above the center of the wheel 301 and the weight of the entire generator set 1 is almost entirely borne by the wheel devices 3. Therefore, the burden on the operator is very small, and the transportation of the generator set can be achieved easily and conveniently, which greatly increases the portability of the generator set. In addition, in the present disclosure, each wheel 301 may have its own separate wheel axle 303. Therefore, there is no wheel axle inside the housing 5 and the internal space of the housing will not be occupied and wasted, and accordingly it is allowed to use wheel with larger diameter, which greatly increases the adaptability of the wheel to various road conditions and reduces the advance resistance acting on the wheel during the transportation of the generator set. Furthermore, large diameter wheel can also increase the passing ability.

Figure 12:
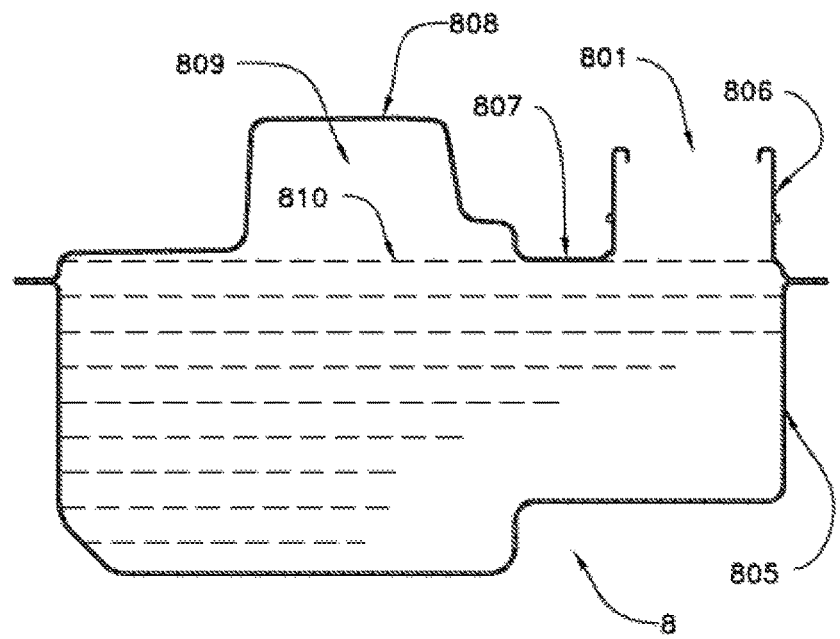
FIG. 12 is a cross-sectional view of the fuel tank when the generator set of the embodiment 1 of the present disclosure is placed vertically.
Figure 13:
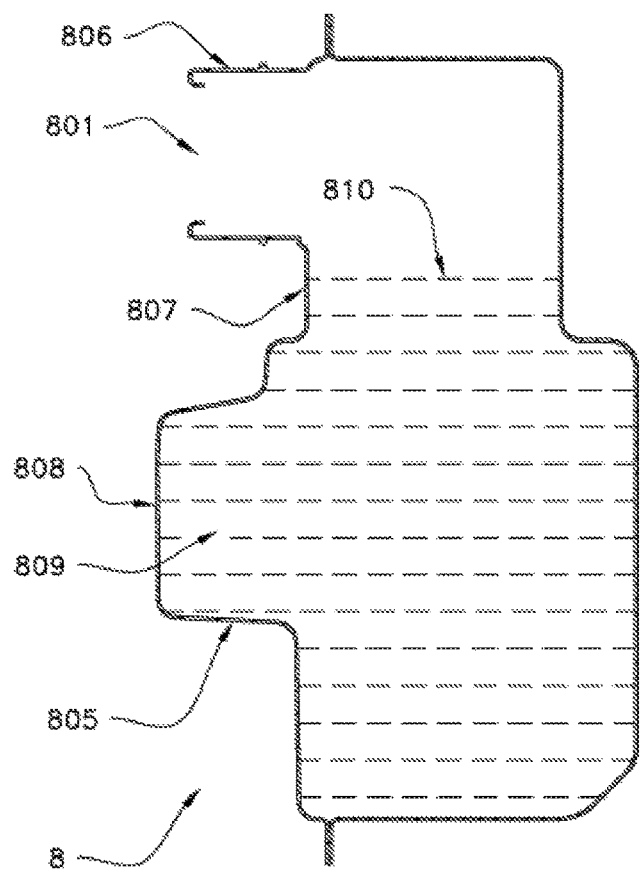
FIG. 13 is a cross-sectional view of the fuel tank when the generator set of the embodiment s of the present disclosure is reclined toward the right side.
Figure 14:
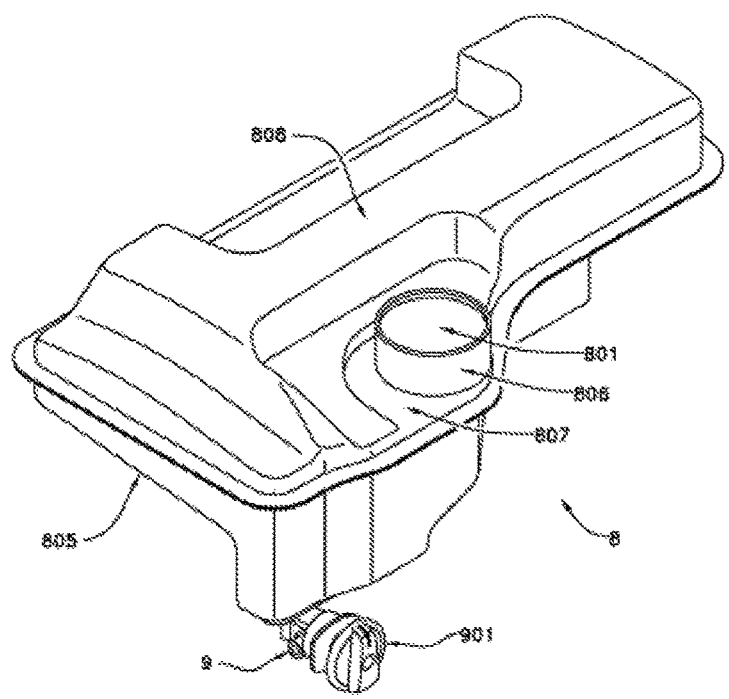
FIG. 14 is a perspective view of the fuel tank of the embodiment 1 of the present disclosure.
Figure 15:
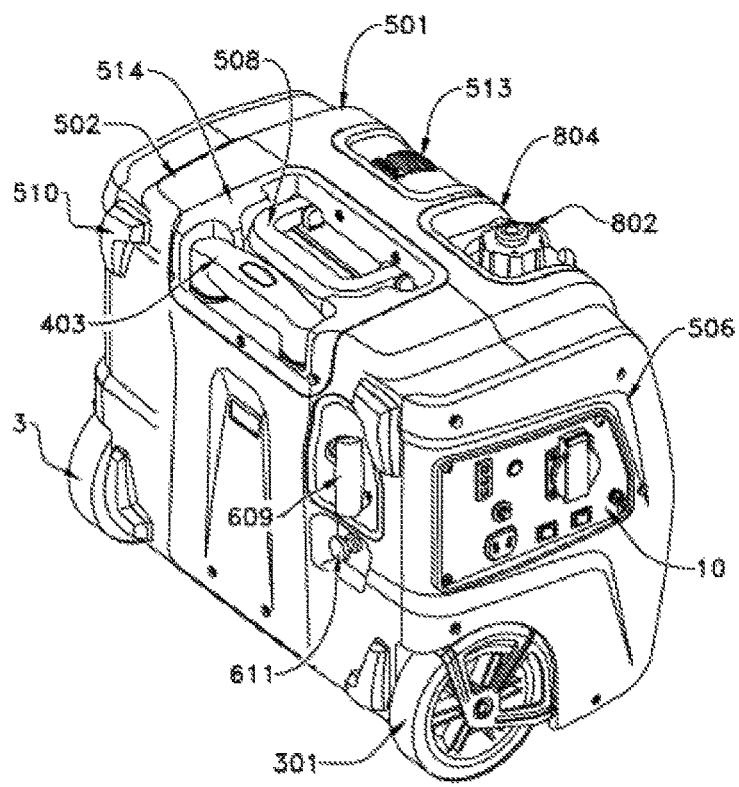
FIG. 15 is a perspective view of the generator set of the embodiment 1 of the present disclosure.

In addition, as shown in FIG. 12, when the generator set 1 is reclined, the fuel in the fuel tank 8 can enter into the hollow cavity 809, thereby reducing the fuel level 810. After the generator set 1 is reclined, as shown in FIG. 13, in the case that the hollow cavity 809 is large enough, the fuel level 810 in the fuel tank 8 can be reduced to below the fuel tank port 801 and the fuel cannot leak out from the fuel tank port 801. Therefore, the generator set of the present disclosure is allowed to be reclined toward left side or right side. The safety is greatly increased, and great convenience for the transportation and storage of the generator set is achieved.

The description above is only preferred embodiments of the present disclosure, but not intended to limit the present disclosure. For those skilled in the art, various modifications and variations can be made. Any modification, equivalent replacement and improvement, etc. made within the spirit and principles of the present disclosure should be included in the scope of protection of the present disclosure.

The invention claimed is:

1. A portable generator set, comprising an engine (6), a generator (7), a fuel tank (8) and a housing (5), wherein, the engine (6), the generator (7) and the fuel tank (8) are housed in the housing (5), the fuel tank (8) is constructed by a fuel tank housing (805), a fuel tank port (801), a fuel tank cap (802) and a fuel tank top surface (808), and the portable generator set is characterized in that, the fuel tank top surface (808) is provided with a protrusion structure protruding outward, and a hollow cavity (809) communicated with an inner cavity of the fuel tank (8) is formed on an inner side of the protrusion structure such that fuel in the fuel tank (8) is able to enter into the hollow cavity (809) when the generator set (1) is reclined,
- wherein, the fuel tank port (8) further comprises a fuel tank port neck (806) and a fuel tank port bottom surface (807), the fuel tank port neck (806) is a passage which is formed by extending upward from the fuel tank port bottom surface (807) and by which the fuel enters into or exits from the fuel tank (8), and an external opening of the passage is the fuel tank port (801), and
- the hollow cavity (809) having enough volume to keep fuel level (810) being lower than the fuel tank port (801) in case the fuel tank (8) is reclined and fuel enters into the hollow cavity (809).

2. The portable generator set of claim 1, wherein, the generator set (1) is a cuboidal structure which has a length L, a width W and a height H and is constructed by the engine (6), the generator (7), the fuel tank (8) and the housing (5), shock absorption feet (509) are arranged on bottom of the generator set (1), and foot pads (510) are arranged on a left side (103) or a right side (104) formed by the length L and the height H of the cuboidal structure of the generator set (1).

3. The portable generator set of claim 2, wherein, a pull-type pull rod device (4) is arranged on the left side (103) or the right side (104) formed by the length L and the height H of the cuboidal structure of the generator set (1), and the pull rod device (4) is vertically arranged in a direction of the height H of the generator set (1).

4. The portable generator set of claim 3, wherein, wheel devices (3) are arranged at a same side of the generator set (1) at which the pull rod device (4) is arranged, and the wheel devices (3) are arranged at bottom (105) of the generator set and in a direction of the length L of the generator set (1).

5. The portable generator set of claim 2, wherein, the fuel tank port (801), the fuel tank cap (802) and a fuel switch (9) are arranged near the left side (103) or the right side (104) of the generator set (1), the fuel tank port (801) and corresponding fuel tank cap (802) are arranged at top of the generator set (1), and the fuel switch (9) is arranged on a side of the generator set below the fuel tank port (801) and the fuel tank cap (802).

6. The portable generator set of claim 1, wherein, the housing (5) of the generator set (1) is provided with a maintenance cover (504), and an engine oil maintenance cover (5041) is arranged on the maintenance cover (504).

7. The portable generator set of claim 1, wherein, the generator set (1) is provided with a starting handle (609), and the starting handle (609) is arranged at a left side (103) or a right side (104) of the generator set.

8. The portable generator set of claim 7, wherein a damper handle (611) is arranged at a same side to the starting handle (609).

9. The portable generator set of claim 1, wherein, a handle (508) is arranged at top of the generator set (1), and the handle (508) and the housing (5) are connected by a rotating connection or a fixed connection.

10. The portable generator set of claim 2, wherein, the housing (5) of the generator set (1) is provided with a maintenance cover (504), and an engine oil maintenance cover (5041) is arranged on the maintenance cover (504).

11. The portable generator set of claim 2, wherein, the generator set (1) is provided with a starting handle (609), and the starting handle (609) is arranged at a left side (103) or a right side (104) of the generator set.

12. The portable generator set of claim 11, wherein a damper handle (611) is arranged at a same side to the starting handle (609).

13. The portable generator set of claim 2, wherein, a handle (508) is arranged at top of the generator set (1), and the handle (508) and the housing (5) are connected by a rotating connection or a fixed connection.

* * * * *